United States Patent [19]

Seidel

[11] Patent Number: 4,486,740
[45] Date of Patent: Dec. 4, 1984

[54] DC CANCELLATION IN TERNARY-CODED DATA SYSTEMS

[75] Inventor: Harold Seidel, Warren, N.J.

[73] Assignee: AT&T Bell Laboratories, Murray Hill, N.J.

[21] Appl. No.: 447,492

[22] Filed: Dec. 6, 1982

[51] Int. Cl.³ .......................................... H03K 13/00
[52] U.S. Cl. ............................ 340/347 DD; 375/19; 370/102
[58] Field of Search ............... 340/347 DD; 360/38, 360/39, 40, 41, 42; 370/102; 371/55, 56; 375/17, 19, 25

[56] References Cited

U.S. PATENT DOCUMENTS

| | | | |
|---|---|---|---|
| 3,504,287 | 3/1970 | Deregrnaucourt | 370/102 |
| 3,611,141 | 10/1971 | Waters | 340/347 DD |
| 3,631,471 | 12/1971 | Griffiths | 340/347 DD |
| 4,071,692 | 1/1978 | Weir | 375/25 |
| 4,255,742 | 3/1981 | Gable | 340/347 DD |
| 4,310,860 | 1/1982 | Leiner | 360/40 |
| 4,394,641 | 7/1983 | Artigalas | 340/347 DD |

*Primary Examiner*—C. D. Miller
*Attorney, Agent, or Firm*—John T. Poeoples; John K. Mullarney

[57] ABSTRACT

An encoder (100) for processing an input signal to produce a ternary coded data stream having supressed DC comprises circuitry, and its associated methodology, including an arrangement (120,130,150) for augmenting the data stream with a compensating set of code symbols as determined by the number of positive and negative code symbols in the data stream as well as all prior compensating code symbols. A decoder (200) processes the received signal to extract the symbols in the data stream corresponding to the input signal. In order to achieve a preselected end-to-end transmission rate with the encoder-decoder combination, the rate of the signal propagated between encoder and decoder is increased to compensate for the appended code symbols.

5 Claims, 3 Drawing Figures

DC CANCELLATION IN TERNARY-CODED DATA SYSTEMS

TECHNICAL FIELD

This invention relates generally to digital data communication systems and, more particularly, to ternary coding and decoding of an intelligence signal in order to eliminate the DC component of the resultant encoded signal.

BACKGROUND OF THE INVENTION

Most digital systems transmit a bipolar-coded signal, or some code modification such as bipolar with constraints for zero suppression, to virtually eliminate DC and low-frequency signal components. In telecommunication systems incorporating digital transmission, this mitigation of low-frequency energy permits, for example, transformer coupling between transmission circuitry and repeaters. However, the alternate polarity signal is pseudoternary in the sense that only two bits of information may be conveyed wherein three bits are available in each time slot. Thus, the penalty incurred is approximately a sixty percent [(log 3/log 2−1] loss of bit rate capacity.

The system disclosed in U.S. Pat. No. 4,071,692 issued Jan. 31, 1978 to Weir et al, provides some increase in capacity but at the expense of increased low frequency energy. In this reference, a PCM system is described wherein the intelligence is conveyed via a bipolar signal with zero suppression. To provide some additional information (typically synchronizing pulses) when needed, violations of the alternating bit rule are imposed. To maintain a low DC level, a pseudo-random bit stream is added to the intelligence signal prior to coding, thereby causing numerous bit transitions that mask the violations. Even with this provision for additional information transfer, there is still a significant loss of capacity from the theoretical since the increase amounts to only one additional bit per frame.

SUMMARY OF THE INVENTION

In accordance with an illustrative embodiment of the present invention, a digital encoder provides for true ternary coding, that is, the constraint of DC cancellation between adjacent nonzero symbols is not imposed. Ternary coding occurs over a frame or block comprising a plurality (N) of code symbols. At the end of each frame, a number (M) of symbols are appended to correct for any cumulative imbalance in the number of oppositely-signed symbols. Since the imbalance is proportional to $N^{\frac{1}{2}}$ for fluctuating intelligence signals, one appropriate selection for M is $N^{\frac{1}{2}}$, so the loss of capacity may be expressed as $(N+N^{\frac{1}{2}})/N-1=N^{-\frac{1}{2}}$. Thus, for example, if the number of symbols in a frame is 16, then the loss of capacity is only 25%, as contrasted to 60% for constrained bipolar system. In this example, four ($N^{\frac{1}{2}}=4$) symbols are appended to each frame. To maintain the same end-to-end transmission rate of the encoder-decoder combination, the encoder transmission rate is increased to offset the additional number of compensating symbols added to a frame.

The decoder operates in a manner obverse to the encoder. The augmented data stream, comprising both the original data symbols as well as the appended symbols propagating at a rate exceeding the end-to-end transmission rate, is processed by a clock recovery-gate arrangement that passes only those symbols in each block associated with the intelligence signal. The output of this arrangement is presented to a rate decreasing circuit to reproduce the original data symbols at the throughput transmission rate of the overall system.

The organization and operation of this invention will be better understood from a consideration of the detailed description of the illustrative embodiment thereof, which follows, when taken in conjunction with the accompanying drawing.

DETAILED DESCRIPTION

Figure 1:
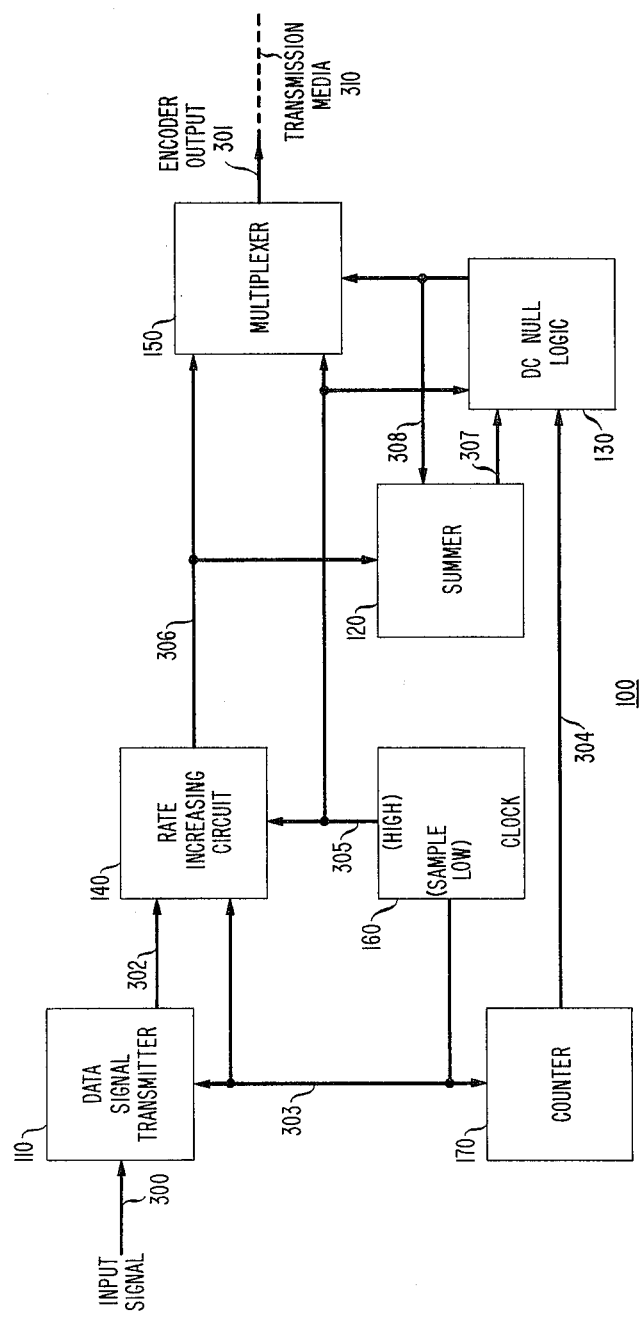
FIG. 1 is a block diagram of a digital data encoder in accordance with the principles of the present invention.

FIG. 1 illustrates one embodiment of encoder 100 in accordance with the present invention. An input signal, typically a voice-frequency signal, arrives at the input to encoder 100 on channel 300. Data transmitter 110 samples this input signal, identifies each sample as either a null level, first level or second level sample by comparison to two predetermined threshold settings, and then emits a ternary-coded data stream on channel 302. This data stream is propagated at a first signal rate; clock 160 provides transmitter 110 with a timing signal having this first rate as well as the sampling signal via lead 303. Typically, the second level sample is the oppositely-signed version of the first level sample and the threshold settings are symmetric about the null or zero signal level.

The data symbols appearing on lead 302 are partitioned into blocks having a plurality (N) symbols per block. This partitioning is depicted on line (i) of FIG. 3 wherein the first block (BLOCK 1) and a portion of the second block (BLOCK 2) are displayed on the time axis. The actual symbols are not shown, only the time periods occupied by the symbols. Each block on lead 302 has a duration of N low-rate time periods. Counter 170, also connected to clock 160 via lead 303, produces an output signal on channel 304 each time N low-rate time periods have elapsed.

Rate increasing circuit 140 serves to increase the rate of transmission of the data stream on lead 302 from the first rate to a second rate exceeding the first rate. This rate change is required in order to maintain the same end-to-end transmission rate of an encoder-decoder cascade since M data symbols are inserted in each block by encoder 100. Typically, $M=N^{\frac{1}{2}}$, although the selection is dependent on the variation of the signal appearing on lead 300. The loss of capacity for the general case is expressible as 100M/N percent, and for the special case as $100N^{-\frac{1}{2}}$.

Figure 3:
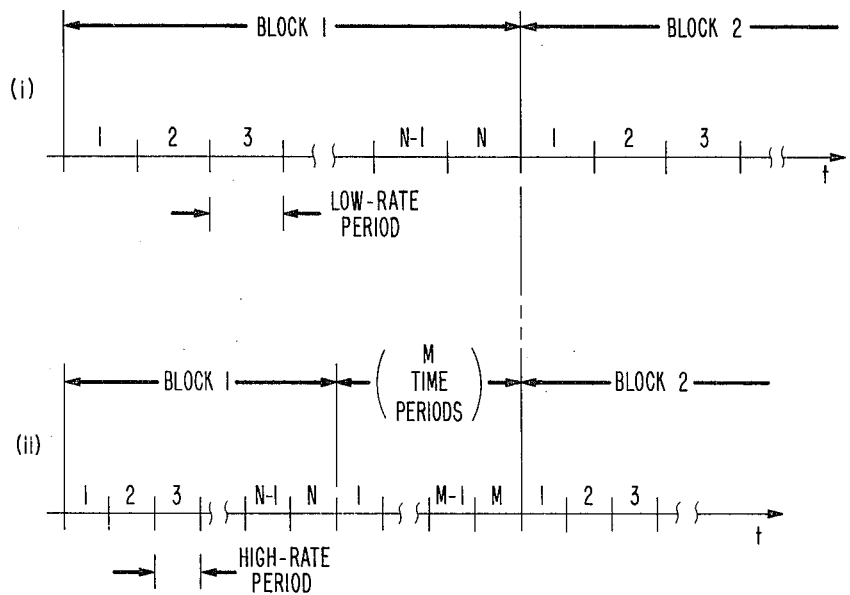
FIG. 3 depicts a timing diagram for the encoder of FIG. 1 and the decoder of FIG. 2.

Clock 160 feeds both the low-rate and high-rate signals to rate increasing circuit 140 on leads 303 and 305, respectively. The stream of rate-changed data produced by circuit 140 appears on channel 306. Line (ii) of FIG. 3 depicts the time periods occupied by the rate-changed stream. The total number of high-rate periods required to transmit an augmented block having M appended symbols is M+N. Counter 170 also produces a signal every N periods of the high-rate signal on channel 304. One embodiment of a rate-increasing circuit is a shift register having a shift-in rate corresponding to the low-rate signal and a shift-out rate corresponding to the high-rate signal.

Summer 120 tabulates both the number of positive symbols and the number of negative symbols appearing in the rate-changed stream on lead 306. These symbols are located in the first N time periods of the high-rate clock, as depicted by BLOCK 1 or BLOCK 2 on line (ii) of FIG. 3. The M periods of each block on lead 306 appear as null symbols so summer 120 is unaffected by these M periods.

Summer 120, clock 160 and counter 170 serve as inputs to DC null logic 130, via leads 307, 305 and 304, respectively. Logic 130, in response to the signal on lead 304 corresponding to the completion of N high-rate periods, produces, at most, M data symbols to reduce or cancel the net difference in oppositely-signed symbols as accumulated by summer 120. These M symbols appear on lead 308, which couples to multiplexer 150 and summer 120. Multiplexer 150 accepts the rate-changed data stream on lead 306, inserts the symbols produced by logic 130 into the last M time periods of each augmented data block, and produces the output of encoder 100 on lead 301. Multiplexer 150 derives timing information from clock 160, via lead 305, and from logic 130, via lead 308.

As M data symbols are inserted into the stream on lead 306, summer 120 is adjusted to reduce the net count in the emitted symbol types. For example, if summer 120 registered three positive symbols and two negative symbols at the end of the last N high-rate periods associated with an augmented block, then one negative symbol is inserted in the stream and summer 120 is changed to register two positive and two negative symbols at the completion of the augmented block. If the net difference in oppositely-coded symbols cannot be eliminated within the M available time slots, the excess is carried over to the next block. This process continues until logic 130 can conclude its compensation.

Not explicitly shown in FIG. 1 is circuitry for generating synchronizing pulses. One pulse typically occurs at the beginning of each augmented block and is utilized by the decoder to produce timing information. The synchronizing pulse stream is bipolar in nature and does not affect the DC level in the data stream on lead 301.

Figure 2:
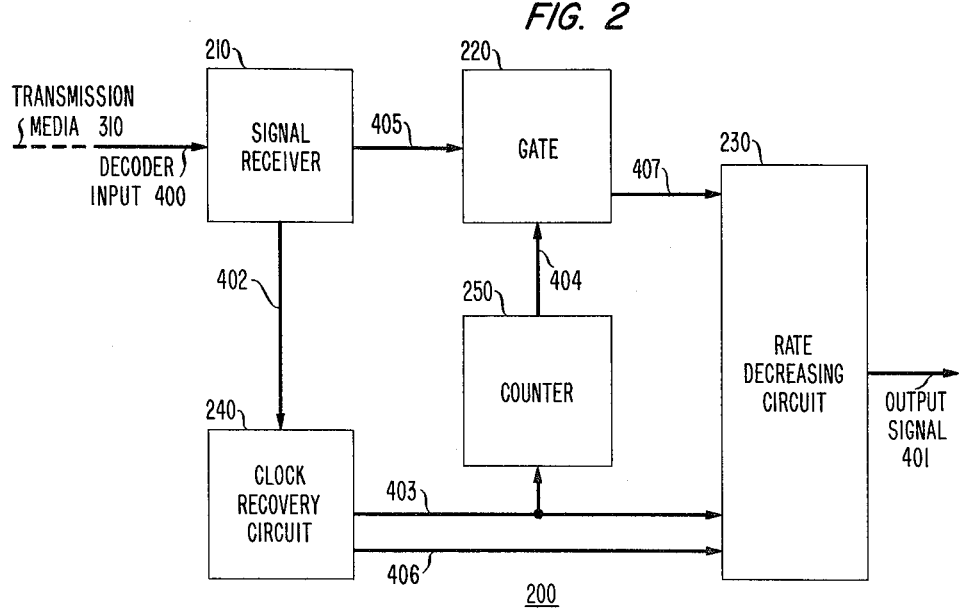
FIG. 2 is a block diagram of a digital data decoder to receive the data signal generated by the circuitry of FIG. 1.

FIG. 2 depicts one illustrative embodiment of decoder 200 in accordance with the present invention. The input to decoder 200 appears on channel 400, which is typically one of many channels supported by transmission medium 310. Signal receiver 210 serves as a buffer to channel 400; moreover, receiver 210 may incorporate signal regeneration, error detection or error correction capability, depending on the type of the digital system implemented.

Clock recovery circuit 240 processes the input data stream, as provided by lead 402 from receiver 210, to derive decoder timing from the synchronizing pulses. The signal on lead 403 is a multiple of the synchronizing pulse rate and corresponds to high-rate signal generated in encoder 100. Similarly, the signal on lead 406 corresponds to the low-rate signal and is derived as another multiple of the synchronizing pulse rate. Counter 250 produces an output on lead 404 after N and N+M time periods, and multiples thereof, have elapsed in the recovered signal on lead 403.

Gate 220, which has the data stream on lead 405 and the gating pulses on lead 404 at its input, is activated during the interval in which the N code symbols corresponding to the intelligence data are present. For example, in line (ii) of FIG. 3, this interval for the first block has the label BLOCK 1.

Rate decreasing circuit 230 receives its input data from gate 220, via lead 407, and timing information from clock circuit 240 on leads 403 and 406. Circuit 230 expands the time period occupied by each symbol in the high-rate data stream to obtain the low-rate stream appearing on lead 401, which serves as the system output. Rate decreasing circuit 230 may also be implemented with a shift register having a shift-in rate corresponding to the high-rate signal and a shift-out rate corresponding to the low-rate signal.

It is to be further understood that both the encoder and decoder, and associated methodology, described herein is not limited to specific forms disclosed by way of example and illustration, but may assume other embodiments limited only by the scope of the appended claims.

What is claimed is:

1. Circuitry (100) for digitally encoding an input signal (300) to produce an output signal (301) comprising means (160,170) for producing: a first signal having a first rate; a second signal having a second rate, said second rate exceeding said first rate; and time periods proportional to said first rate, means (110,140), responsive to said means for producing and said input signal, for generating during the current one of said periods a ternary-coded data stream corresponding to said input signal, said stream having first and second symbol levels in addition to a null level, means (120,130,150), responsive to said means for producing and said means for generating, for augmenting said data stream with a compensating set of said symbols as determined by the number of said first and said second levels in said current one and all prior said periods and the number of compensating symbols in said all prior periods.

2. A digital encoder (100) for producing an output signal (301) from an input signal (300) comprising a clock (160) for generating a low-rate signal and a high-rate signal, a transmitter (110) responsive to said low-rate signal and said input signal, for generating a ternary-coded data stream corresponding to said input signal, said stream having symbols with positive, negative and zero values, a counter (170), coupled to said clock, for processing said low-rate signal to identify contiguous blocks of symbols in said stream, each of said blocks occupying a predetermined time interval, means (140), coupled to said transmitter and responsive to said clock, for changing the rate of said stream from said low-rate to said high-rate to produce a rate-changed signal, a summer (120), responsive to said means for changing, for accumulating the number of said positive and said negative symbols in said rate-changed signal, a logic circuit (130), coupled to said summer, said counter and said clock, for generating compensating blocks of code symbols at said high-rate, each of said compensating blocks being produced within each said time interval associated with each of said contiguous blocks and being determined by the net difference between said number of symbols, a multiplexer (150), responsive to said logic circuit, said clock and said means for changing, for appending said each of said compensating blocks to said each of said contiguous blocks in said rate-changed signal to produce said output signal, said summer being responsive to said logic circuit to adjust said net difference at the end of each said interval by the number of said code symbols in each of said compensating blocks.

3. A digital decoder (200) for producing an output signal (401) from an input data stream (400) operating at a transmission rate, said decoder comprising a receiver (210) for detecting said data stream and for producing a resultant stream of ternary coded symbols, a clock recovery circuit (240), coupled to said receiver, for deriving a high-rate signal corresponding to said transmission rate and a low-rate signal from information in said data stream, a counter (250), coupled to said clock circuit, for generating periodic time intervals of preselected duration proportional to said high-rate signal, a gate (220), coupled to said counter and said receiver, for selecting a number of said symbols in said stream corresponding to each of said intervals, and a rate-decreasing circuit (230), coupled to said gate and said clock circuit, for changing the rate of propagation of said number of symbols from said high-rate to said low-rate to produce said output signal.

4. A digital encoder for producing a ternary coded output signal from an input signal, said output signal having a suppressed direct current component, comprising means responsive to said input signal for generating a ternary coded data stream of symbols having positive, negative and null values, means receiving said ternary coded data stream and increasing its data rate, means for determining the relative number of positive and negative symbol values in said data stream over a predetermined time period, means responsive to said relative number from the determining means for generating one or more compensating code symbols of positive or negative value, and means for augmenting said ternary coded data stream of increased data rate by adding generated compensating code symbols at the end of each predetermined time period to thereby suppress said direct current component.

5. A digital encoder as defined in claim 4 wherein there are N symbols of ternary coded data in said predetermined time period and up to M compensating code symbols are added at the end of each predetermined time period, where $M = N^{\frac{1}{2}}$.

* * * * *